United States Patent [19]

Schumacher, II et al.

[11] Patent Number: 4,612,758

[45] Date of Patent: Sep. 23, 1986

[54] CUTTING FINGER FOR FINGER-BAR CUTTERS

[76] Inventors: Gustav Schumacher, II, Gartenstrasse 8; Günter Schumacher, Raiffeisenstrasse 10, both of 5231 Eichelhardt, Fed. Rep. of Germany

[21] Appl. No.: 521,670

[22] Filed: Aug. 10, 1983

[30] Foreign Application Priority Data

Aug. 19, 1982 [DE] Fed. Rep. of Germany ....... 3230882

[51] Int. Cl.⁴ .......................................... A01D 55/10
[52] U.S. Cl. ........................................ 56/310; 56/308
[58] Field of Search ................ 56/307, 308, 309, 310, 56/311

[56] References Cited

U.S. PATENT DOCUMENTS

| 2,484,652 | 10/1949 | Schoenrock | 56/309 |
| 2,529,087 | 11/1950 | Leake | 56/310 |
| 4,286,425 | 9/1981 | Schumacher, II et al. | 56/307 |

FOREIGN PATENT DOCUMENTS 654494  11/1950  United Kingdom ................ 56/311

*Primary Examiner*—Robert P. Swiatek
*Assistant Examiner*—David L. Tarnoff
*Attorney, Agent, or Firm*—John S. Roberts, Jr.

[57] ABSTRACT

The invention relates to a cutting finger for finger-bar cutters of harvesting machines with a top finger and a bottom finger stamped out from flat material and connected to one another in front of the blade gap, in which cutting finger the top finger and/or the bottom finger are deformed in the region located in front of the blade gap and are connected to one another by welding.

10 Claims, 17 Drawing Figures

CUTTING FINGER FOR FINGER-BAR CUTTERS

The invention relates to a cutting finger for finger-bar cutters of harvesting machines. Cutting fingers of this type are used in a wide variety of embodiments both as individual fingers and as multiple fingers. Cutting fingers produced as drop-forged articles or as castings are the most common. They consist essentially of the stable finger bottom part, screwed at its rear end to the finger bar, the finger tip tapering to a point and extending forwards, and the finger lip or the finger top part which extends from the finger tip to the rear and which forms with the finger bottom part a gap in which the knife blade is moved to and fro.

The finger top part, also called a finger lip, is connected firmly by one of its ends to the finger tip or is made in one piece with this. In most cases, the top part is formed by milling the knife-blade gap out of the cutting finger forged as a whole.

Other embodiments of cutting fingers for finger-bar cutters are described in Australian Patent Specification No. 43,403/68 and in German Offenlegungsschrift No. 2,855,234.

They consist of stamped articles which have been obtained by stamping out from flat material of suitable thickness. Two or even more stamped articles are connected to one another by welding, riveting or screwing to form an individual or multiple finger (as a rule, a double finger). In such an embodiment, the connection between the finger bottom part and the finger top part is made in front of the blade gap where the two parts rest flat on one another. This connection region forms the cutting-finger tip, whilst the other end of the bottom finger and top finger are screwed to the finger bar, that is to say behind the knife-blade gap. The knife gap is formed, as a rule, by bending either the top finger or the bottom finger or, if appropriate, both of these.

In such a known embodiment, although the shape of the finger tip, tapering conically to a point, is fairly stable in a horizontal direction, nevertheless the stability is not very great in a vertical direction and is based, in particular, only on the material thickness of the finger top part and finger bottom part which are connected to one another in this region located in front of the knife gap.

This low stability in a vertical direction has an especially adverse effect on the cutting-finger tip. When the tip strikes against an obstacle, such as, for example, a stone or other foreign bodies, under rough operating conditions in the field, the tip easily breaks off or is bent out of shape. Furthermore, in the case of cutting fingers to which grain lifters are fastened, the tips of the cutting fingers are broken off very easily when a grain lifter is overloaded and at the same time is pulled downwards.

These single, double or multiple cutting fingers which are made from flat material and in which the finger top part is extended up to the finger bar and is fastened there in the same way as the finger bottom part have per se an extremely high stability both in a horizontal direction and in a vertical direction. Only the cutting-finger tip represents a weak point, as discussed above.

The object of the present invention is, therefore, to provide a cutting finger for finger-bar cutters of harvesting machines, which has a top finger and a bottom finger stamped out from flat material and connected to one another in front of the blade gap and which has as a whole a stability similar to that of the forged cutting fingers mentioned in the introduction.

This object according to the invention is achieved when the top finger and/or the bottom finger are deformed in the region located in front of the blade gap and are connected to one another by welding.

This deformation which is possible per se in any way ensures that the finger parts (bottom finger and top finger) hitherto resting flat on one another now rest on one another in another form and are welded to one another so that, whatever the deformation, an improved stability in a vertical direction is achieved.

It has proved especially advantageous, here, if the top finger and/or the bottom finger are deformed over their entire length located in front of the blade gap and are connected to one another by welding.

By means of this embodiment, an improvement in vertical stability over the entire length of the cutting-finger tip is obtained.

According to an especially advantageous embodiment of the cutting finger according to the invention, the top finger and/or the bottom finger are profiled and are connected to one another in the profiled region by welding.

A profiling which has proved especially suitable is, in particular, a profiling which is crescent-shaped in cross-section and which extends over one finger part or both finger parts (bottom finger and top finger).

If one finger part only has a crescent-shaped profiling, the edge of this crescent-shaped profiling can be connected easily to the other flat finger part by welding, for example by resistance welding. On the other hand, however, even both finger parts can have a crescent-shaped profiling in cross-section, but in opposite directions. Even in such an embodiment, a stable connection can easily be achieved by resistance welding between the two finger parts, and consequently an extremely stable cutting-finger tip can be obtained.

Of course, in all these embodiments mentioned above and the profilings of the two finger parts which are also possible, electrode welding can also be used for making the connection, since, as a rule, appropriate space for the welding seam can always be provided as a result of special profiling.

According to another advantageous embodiment of the present invention, the top finger and/or the bottom finger of the cutting finger are twisted and are connected to one another in the twisted region by welding.

As a result of such twisting the twisted region of, for example, the top finger no longer rests flat on the bottom finger, but encounters the latter only at its edge. This edge can easily be connected to the base, namely the bottom finger, by resistance welding without the need for additional welding materials. It has proved especially advantageous if the twisting of the finger part or finger parts is respectively approximately 45°.

In the basic form, the finger bottom part is stamped out so as to taper to a point. When, as mentioned above, this tip is twisted, for example, 45° and then welded to the top part along the edge, a wedge-shaped design, extremely stable in a vertical direction, of the cutting-finger tip is obtained. According to the material thickness used, a sharp edge which comes up against the top part is thereby obtained. This sharp edge forms an ideal basis for connection to the top part according to the so-called projection welding (resistance welding). The edge is fused as a welding seam with the top part.

On the other hand, the tip, twisted by a specific angular amount, of one finger part also forms, when resting against a flat counterpiece, a gap having a basic form which is wedge-shaped in cross-section. This gap is pre-eminently suitable as a welding gap for receiving the electrode material in electric-arc welding. In this case, twisting need not even amount to 45°. On the contrary, it is sufficient to provide a number of degrees which produces a gap of the size needed for the particular welding process selected.

According to another advantageous embodiment of the present invention, the top finger or the bottom finger are arranged twisted approximately 90° relative to one another and are connected to one another by welding. In such an embodiment, one finger part rests along its twisted tip approximately perpendicularly on the other finger part, and an approximately T-shaped cross-section is thus formed. Even in this embodiment, the connection can be made very easily by resistance welding. On the other hand, electrode welding can also be used easily in this embodiment since a fillet weld can be made in a simple manner on both sides of the finger part resting perpendicularly.

It is thus evident that in the above-described embodiments according to the invention of the cutting fingers the connection between the two finger parts can be made either by a resistance-welding process or by an electric-arc welding process.

As a rule, the resistance-welding process proves to be substantially quicker and simpler to carry out and would therefore seem to be the more economical production process.

In all the embodiments discussed above, in which one or, if appropriate, both finger parts are twisted by a specific angular amount out of the plane of the top finger or bottom finger respectively, the intention will normally be to arrange the twisting zone as near as possible to the cutting-knife gap, so that as long a region of the appropriate finger part as possible is twisted out of the plane and so that substantially improved stability also in a vertical direction is consequently achieved over the entire length of this twisted region.

The invention is explained in more detail below by reference to the exemplary embodiments illustrated in the drawings in which:

FIG. 1 shows a finger tip of a cutting finger according to the invention, with a twisted tip of the bottom finger, FIG. 2 shows a cross-section along the line A—A in FIG. 1, FIG. 3 shows a finger tip of a cutting finger according to the invention, with a twisted tip of the top finger, FIG. 4 shows a cross-section along the line B—B in FIG. 3, FIG. 5 shows a finger tip of a cutting finger according to the invention, with a crescent-shaped profiled tip of the top finger, FIG. 6 shows a cross-section along the line C—C in FIG. 5, FIG. 7 shows a finger tip of a cutting finger according to the invention, with a crescent-shaped profiled tip of the bottom finger, FIG. 8 shows a cross-section along the line D—D in FIG. 7, FIG. 9 shows a finger tip of a cutting finger according to the invention, with crescent-shaped profiled tips of the bottom finger and top finger, FIG. 10 shows a cross-section along the line E—E in FIG. 9, FIG. 11 shows a cross-section through the tip of a cutting finger according to the invention with the tip of the bottom finger twisted at 90°.

Figure 1:
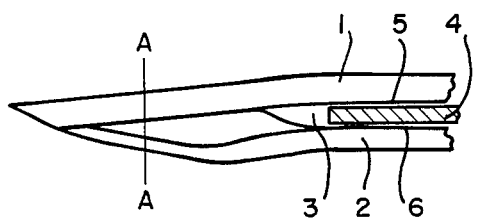
Figure 2:
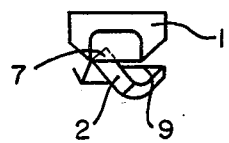

In the exemplary embodiment illustrated in FIG. 1, as in all the other exemplary embodiments shown, the fastening to the finger bar, provided at one end of the cutting finger, has been omitted for the sake of clarity. As a rule, fastening is effected by screwing the end of the bottom finger and the end of the top finger, extended up to the finger bar, to the finger bar by means of the cutting-finger fastening screw. This method of fastening emerges, for example, from the Australian Patent Specification mentioned in the introduction and from German Offenlegungsschrift 28 55 234.3-23.

Located between the top finger 1 and the bottom finger 2 is the blade gap 3 in which the cutting-knife blade 4 is moved to and fro. At the same time, the edges 5 and 6 form the countercutters for the cutting-knife blade 4. The top finger 1 and the bottom finger 2 are welded to one another in front of the blade gap 3.

According to the known state of the art, the top finger 1 and the bottom finger 2 rest with their tips flat on one another and are connected to one another by welding or riveting, the blade gap being formed by the top finger 1 and the bottom finger 2 being bent by a specific amount. This type of connection is very liable to break.

In the exemplary embodiment of the invention illustrated in FIG. 1, the tip of the bottom finger is twisted a specific angular amount in front of the blade gap. This results in the edge 7 which rests against the flat underside of the top finger 1. This edge forms the welding contact in a similar way to a projection provided in the material in a known projection welding. When the top finger 1 and bottom finger 2 are now pressed against one another by means of electrodes of appropriate shape and the welding current is switched on, the edge 7 is welded to the underside of the top part 1. Because of the basic shape, tapering to a point, of the top finger 1 and bottom finger 2, a finger tip of high stability, which is wedged-shaped both horizontally and vertically, is obtained after the weld connection is made.

The weld connection can also be made by normal welding according to the electric-arc process with an electrode. In this case, the gap 9 which is wedge-shaped in cross-section forms a favourable welding gap.

Figure 3:
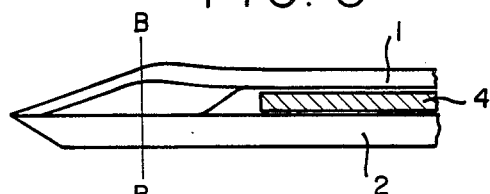
Figures 4, 11:
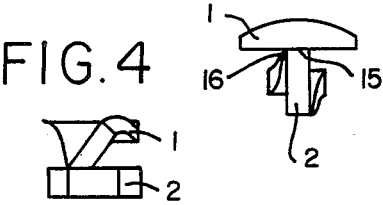

In a further embodiment according to FIGS. 3 and 4, it is not the bottom finger 2, but the top finger 1 which is twisted. An embodiment of this type can be advantageous in cutting machines in which the cutting fingers are arranged not with their tips inclined towards the ground, but parallel or even with their tips rising.

Welding can, of course, be carried out here by means of the same process as described in the first exemplary embodiment.

Figure 5:
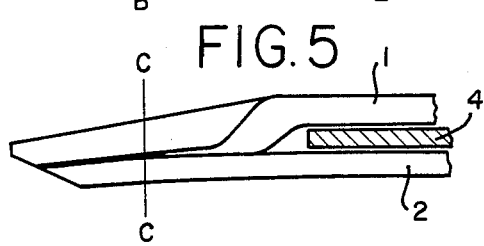
Figure 6:
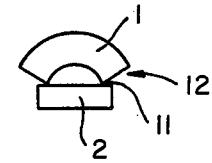

FIGS. 5 and 6 show a cutting-finger tip with a crescent-shaped profiled finger top part and a flat finger bottom part. In this case, the two edges 11 form the weld points for resistance welding, and the fillets 12 constitute the space for the welding seam in conventional welding with electrodes.

Figure 7:
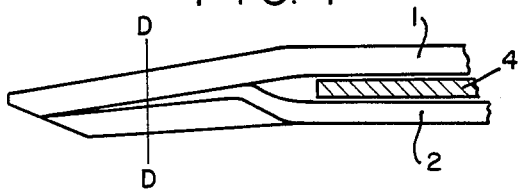
Figure 8:
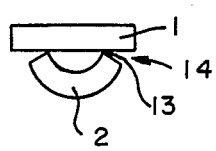

FIGS. 7 and 8 illustrate the opposite alternative form, with the edges 13 for resistance welding and the fillets 14 for electrode welding.

As already described above, both embodiments may be necessary, depending on whether the cutting fingers are inclined towards the ground or are directed upwards.

Figure 9:
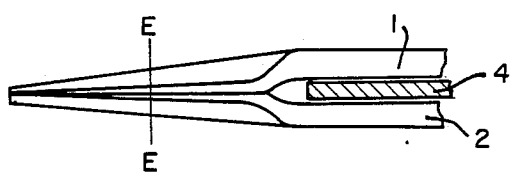
Figure 10:
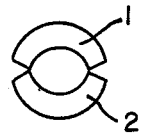
Figure 12:
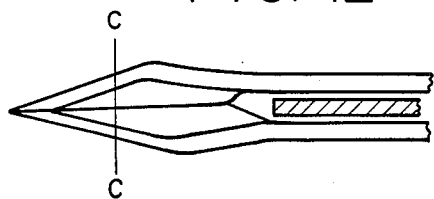
FIG. 12 shows a finger tip of a cutting finger according to the invention, with a twisted tip of both the top finger and the bottom finger.
Figure 13:
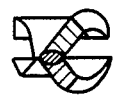
FIG. 13 shows a cross-section along the line C—C in FIG. 12.
Figure 14:
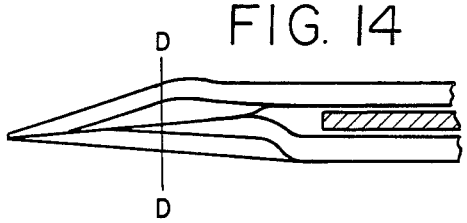
FIG. 14 shows a finger tip of a cutting finger according to the invention, with a crescent-shaped profiled tip of the top finger, and a twisted tip of the bottom finger.
Figure 15:
FIG. 15 shows a cross section along line D—D in FIG. 14.
Figure 16:
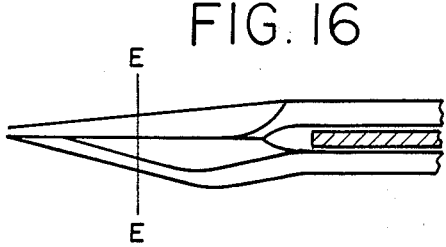
FIG. 16 shows a finger tip of a cutting finger according to the invention, with a twisted tip of the top finger and a crescent-shape profiled tip of the bottom finger.
Figure 17:
FIG. 17 shows a cross-section along the line E—E in FIG. 16.

Finally, in FIGS. 9 and 10, both the bottom finger 2 and the top finger 1 have a crescent-shaped profiling. Here again, either resistance welding or conventional electrode welding can be used, since both edges as a basis for projection welding and fillets for electrode welding are present.

Finally, FIG. 11 illustrates an embodiment of the invention in cross-section, in which the twisting of one of the two finger parts amounts to 90°. The relatively narrow bearing surface 15 is likewise suitable for resistance welding, and the two fillets 16 are suitable for conventional electrode welding. The amount of twisting or profiling can differ widely. It can vary greatly, depending on the material thickness, and, in practice, can be adapted to the particular requirements.

In addition to the exemplary embodiments illustrated, a twisted finger part can also be welded to a profiled finger part, so that a plurality of possible combinations arises in order to meet all the requirements which occur in practice.

For example, a twisted tip of the bottom finger can be connected to a crescent-shaped profiling of the top finger, and vice versa.

We claim:

1. A cutting finger for finger-bar cutters of harvesting machines, said cutting finger comprising a finger top part and a finger bottom part formed from flat material and defining a blade gap there-between, said finger top and bottom parts being connected to one another by welding in a finger front portion located in front of the blade gap, at least one of the finger top and bottom parts being bent or deformed in said finger front portion located in front of the blade gap, characterized in that at least one of the finger top part and the finger bottom part are deformed in the form of a twisting around the longitudinal axis of the cutting finger and are connected in the twisted area by welding.

2. The cutting finger according to claim 1, wherein the finger top part and the finger bottom part are twisted over substantially the entire length of said finger front portion located in front of the blade gap.

3. The cutting finger according to claim 1 and claim 2, wherein the twisting extends through an angle of about 45 degrees.

4. The cutting finger according to claim 1 and claim 2, wherein the twisting extends through an angle of about 90 degrees.

5. The cutting finger according to claim 1, wherein the finger top part and the finger bottom part are connected to one another by resistance welding.

6. The cutting finger according to claim 1, wherein the finger top part and the finger bottom part are connected to one another by electric-arc welding.

7. The cutting finger according to claim 1, wherein the finger bottom part is twisted over substantially the entire length of said finger front portion located in front of the blade gap and the finger top part is deformed over substantially the entire length of said finger front portion located in front of the blade gap and both are connected with each other by welding.

8. The cutting finger according to claim 7, wherein the finger top part has a crescent-shaped profiling over substantially the entire length of said finger front portion located in front of the blade gap.

9. The cutting finger according to claim 1, wherein the finger top part is twisted over substantially the entire length of said finger front portion located in front of the blade gap and the finger bottom part is deformed over substantially the entire length of said finger front portion located in front of the blade gap and both are connected with each other by welding.

10. The cutting finger according to claim 9, wherein the finger bottom part is deformed with a crescent-shaped profiling over substantially the entire length of said finger front portion located in front of the blade gap.

* * * * *